United States Patent [19]

Warmuth

[11] 4,409,612
[45] Oct. 11, 1983

[54] CIRCUIT ARRANGEMENT FOR SEPARATING THE COMPONENTS OF A PAL COLOR TELEVISION SIGNAL

[75] Inventor: Leo Warmuth, Hamburg, Fed. Rep. of Germany

[73] Assignee: U.S. Philips Corporation, New York, N.Y.

[21] Appl. No.: 303,308

[22] Filed: Sep. 17, 1981

[30] Foreign Application Priority Data

Sep. 20, 1980 [DE] Fed. Rep. of Germany ....... 3035647

[51] Int. Cl.³ .............................................. H04N 9/50
[52] U.S. Cl. ..................................................... 358/24
[58] Field of Search ................................... 358/24, 31

[56] References Cited

U.S. PATENT DOCUMENTS 3,707,596  12/1972  Kuhn ..................................... 358/31

FOREIGN PATENT DOCUMENTS 1333887  10/1973  United Kingdom .................. 358/31
2066615   7/1981  United Kingdom .................. 358/31

*Primary Examiner*—John C. Martin
*Attorney, Agent, or Firm*—Thomas A. Briody; William J. Streeter

[57] ABSTRACT

Circuit arrangement for separating the components of a PAL color television signal, in which the (digitized) u- and v-signals of the subcarrier frequency are passed through two delay lines which produce different time delays (for example 283.5 and 284 chrominance subcarrier periods): an improved cross-talk attenuation from the luminance signal to the chrominance signals in the lower sideband is then obtained.

2 Claims, 5 Drawing Figures

CIRCUIT ARRANGEMENT FOR SEPARATING THE COMPONENTS OF A PAL COLOR TELEVISION SIGNAL

The invention relates to a circuit arrangement for separating the colour difference signal components of a PAL colour television signal, in which the composite chrominance signal is applied through a first path and a second path delayed by substantially one line period or an integral multiple thereof relative to the first path to respective inputs of a combining stage, particularly an adder or a subtracting stage, from whose outputs the separated signals can be derived.

BACKGROUND OF THE INVENTION

Because of the line structure of the television picture such a television signal is essentially assembled from components which are spaced by the line frequency $f_h$ of, for example, 15,625 Hz. The brightness signal consists of such components which start at zero and which may reach to the resolution limit at for example 5 MHz. The two components u and v of the chrominance differential signal which correspond to the blue and the red colour difference signal are located at the line frequency distance above and below the chrominance signal subcarrier frequency $f_o$. The u-components are located on either side of the chrominance signal subcarrier at a distance $f_h$; in contrast therewith the v-components are shifted by half the line frequency $f_h$.

It is known to separate the u- and v-components by means of a decoding arrangement of a comb filter type. To this end the composite signal which contains at least the chrominance signal components is applied to a combining stage, on the one hand directly and on the other hand via a delay device. It is, for example, possible to obtain the u-chrominance signal in a substracting combining stage, when the chrominance signals are delayed in the delay device by a time period corresponding to 283.5 periods of the chrominance signal subcarrier $f_o$ and to obtain the v-chrominance signal in an adding combining stage. In a device which produces a time delay of 283.5 periods a total delay of 63.9433 μs is obtained. It is alternatively possible to use a device which produces a delay of 284 chrominance signal subcarrier oscillations, which correspond to 64.056 μs; the above-mentioned signals are then obtained at the other combining stage, that is to say the u-signal is obtained at the adder stage and the v-signal at the subtracting stage.

With a standardised PAL-colour television signal the subcarrier frequency is not a multiple of the line frequency, but it holds in accordance with the European standard that:

$$f_o = 283{,}75\, f_h + f_v \quad (1).$$

When the vertical deflection frequency $f_v$ is 25 Hz, then:

$$f_o = 283{,}7516\, f_h = 4{,}43361875 \text{ MHz} \quad (2).$$

The maxima and minima of the transmission curves 1, shown in FIG. 1, which are formed by the comb filter properties are defined, in dependence on the frequency f, by the formula:

$$A \sim |\sin \pi \cdot (283{,}5/f_o) \cdot f| \quad (3).$$

The maxima are located in the position where the sine is equal to $(k+\frac{1}{2})\pi$;
the minima are found at $k\pi$, wherein k is an integer.

The frequency $f_x$, at which the maximum of the transmission curve occurs, and the frequency $f_n$, at which the minimum of the transmission curve occurs are found with the above-mentioned values for the chrominance signal subcarrier $f_o$ and the delay by 283.5 chrominance subcarrier periods at $$f_x = (k+\tfrac{1}{2})(283.7516/283{,}5)f_h \text{ and} \quad (4)$$

$$f_n = k \cdot (283{,}7516/283{,}5) \cdot f_h, \text{ respectively} \quad (5)$$

From these formulae it appears that the period of the extremes of the transmission curve 1 do not accurately correspond with a muliple of the line frequency $f_h$. So, when it is ensured, in accordance with the above-indicated customary dimensioning that the extreme values of the transmission curve 1 in the vicinity of the chrominance signal subcarrier correspond substantially exactly with the components of the colour difference signals u and v, a deviation occurs at a somewhat greater frequency distance. As far as the maxima are concerned this is hardly noticeable, as the tops of the sine waves change their value only little at small shifts. At the minima which correspond to the steep edges of the half sine waves the changes are more considerable, but these must be put up with.

FIG. 1 shows portions of the transmission curve along an abscissa, which is divided into sections and scaled in multiples of the frequency f, divided by the line frequency $f_h$. The expanded curve 1 was obtained by means of a device producing a time delay of 283.5 periods of the chrominance subcarrier $f_o$, the output signals of this device being combined with the undelayed signal in a subtracting stage. Above this curve there are shown by means of short upward lines on a horizontal line the u-frequency components of the chrominance signal, while the v-frequency components are represented by downward lines. These components are spaced by a frequency distance which is equal to the line frequency.

When the above-mentioned delayed and the undelayed signals are applied to an adder stage a transmission curve 2 which is defined by the formula:

$$A \sim |\cos \pi 283.5\, f/f_o|,$$

is obtained, which varies in accordance with the broken line curve shown in FIG. 1. It is shown that in the region of the chrominance subcarrier $f_o$, the u-components are located at the maxima of the expanded curve 1 and the v-components at the maxima of the broken-line curves 2. For components which are further away from the chrominance sub-carrier, for example at 211 $f/f_h$ which corresponds to a modulation frequency of 1.14 MHz, there are small shifts with respect to the assigned maximum, which, however, have no effect on filtering of the said modulation components.

Each time the other modulation component is found on these comb filter transmission curves 1 and 2 in the vicinity of the chrominance subcarrier $f_o$ in the range of the peaks of minimum transmission, so that these components are removed by filtering to a considerable extent. For frequencies which are located at a greater distance, for example at the abscissa value 211, which corresponds to 1.14 MHz there is a certain shift of the peaks to the left, so to the lower frequency value, so that then the suppression of each time the other frequency component is not absolute. This is however put up with.

The components of the brightness signals correspond to the abscissa values shown in FIG. 1. These values are located at the edges of the sine and cosine tops, repsectively, of the transmission curves 1 and 2 in such manner that they are somewhat attenuated. As the higher frequency components of the brightness signal have only a rather low energy content and as they are often additionally reduced by an IF-drop in the vicinity of the chrominance subcarrier, the resultant disturbances may be put up with.

Experiments performed showed however that for the circuit arrangement described so far, which produces output signals corresponding to the transmission curves 1 and 2, the minima of the transmission curve 2 move at lower frequencies away from the brightness components and that in a corresponding manner the maxima of the transmission curve 2 move towards the brightness components. This means that in the separated v-chrominance signal the brightness components of, for example, 3.5 MHz and less come through stronger than the brightness components in the range of the chrominance subcarrier frequency $f_o$ of 4.43 Mhz. As furthermore the lower-freqency brightness components have also a higher energy content, they may produce clearly perceptible disturbances in the chrominance signal.

The invention has for its object to provide a circuit arrangement of the type defined in the preamble of such a construction that in the two separated chrominance signal components the lower-frequency brightness signal contents are suppressed better than in the vicinity of the chrominance signal subcarrier.

SUMMARY OF THE INVENTION

According to the invention this object is accomplished in that the delayed signal applied to the first combining stage and the delayed signal applied to the second combining stage are delayed relative to each other.

Preferably, the delayed signals applied to the combining stages are delayed relative to each other by an odd multiple of half a chrominance subcarrier period.

If the output signal is further transmitted in time-division multiplex form, one single combining stage is sufficient, when the delayed signal alternately is taken from the output of the first or of the second delay line by means of a change-over switch which is periodically operated in the ryhythm of a multiple of the chrominance subcarrier frequency, for example double said frequency, and applied to the combining stage.

When in accordance with the invention the delayed signal is applied via, a possibly further, delay unit to the second combining stage, which then operates in the subtacting mode, in such manner that the signal is delayed by an additional half cycle, so for the above-mentioned example by 284 chrominance subcarrier periods, a transmission curve 3, 4 defined by the formula $$A \sim |\sin \pi 284 \cdot (f/f_o)|,$$

is obtained, whose half wave has a somewhat shorter period compared with the half wave shown by means of the broken lines in FIG. 1 and which transmission curve 3, 4 therefore appears to have been compressed and more or less shifted in the direction of the chrominance subcarrier frequency $f_o$. This shift is not noticeable in the region of the chrominance subcarrier $f_o$. In FIG. 1, portions 3 and 4, respectively, of this altered transmission curve are shown by means of dotted lines at the abscissa values 211 and 70. It appeared that at this transmission curve 3 the spectrum component 211 of the brightness signal is now located at a lower ordinate value and is therefore attenuated to a greater extent than in accordance with the broken-line curve 2. This is still more noticeable at the abcissa value 70 which assumes a particularly low value at the curve 4, which is represented there by a dotted line. Thus, in accordance with the invention, the components of the brightness signal are properly filtered from the two chrominance signals u and v, the separation of the chrominance signals substantially not having deteriorated.

As regards the frequency above the chrominance subcarrier frequency $f_o$, for example at the abscissa value 320 which corresponds to 5 MHz, the dotted curve 5 has been shifted so in a circuit arrangement of the invention that the brightness component is attenuated to a lesser degree. However, this range is without any significance for actual practice, as here the average energy contents of the brightness components is so small that it may be neglected, particularly after a customary drop in the IF-stage of a television receiver, so that no additional disturbances are produced in the chrominance signal.

BRIEF DESCRIPTION OF THE DRAWINGS

The invention will now be further described by way of non-limitative example with reference to the accompanying drawing, in which.

DETAILED DESCRIPTION OF THE PREFERRED EMBODIMENTS

Figure 1:
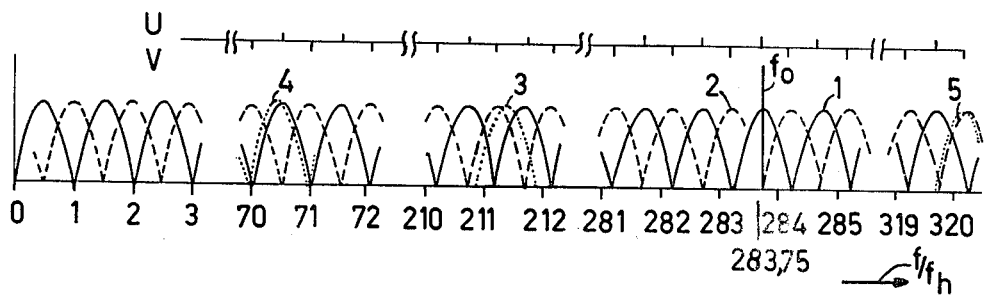
Figure 2:
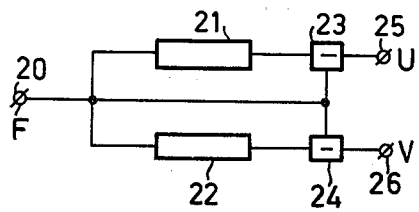
FIGS. 2, 3, 4 and 5 show different embodiments of the invention.

FIG. 2 shows schematically a circuit arrangement of the invention. The input to terminal 20 is the composite chrominance signal F, which in orthogonal modulation contains the component u and the component v, whose sign changes from line to line, is applied to a first subtracting stage 23 via a first delay device 21 and also to a second subtracting stage 24 via a second delay device 22, and, in addition, directly to the two subtracting stages 23 and 24. The first delay device, for example a known glass delay line, produces a delay of 283.5 chrominance subcarrier periods, and the second delay device 22, for example a glass delay line as well, produces a delay of 284 chrominance subcarrier periods. From the output of the subtracting stage 23 a s9ignal is then obtained on output terminal 25 according to the transmission characteristic of the expanded curve 1 of FIG. 1 which consequently results in the u-components from which the v-content has been eliminated. In a corresponding manner there is obtained at the output terminal 26 a signal according to the broken-line portions 3, 4 and 5 of the transmission curve shown in FIG. 1 which consequently results in the v-components from which the u-content has been eliminated.

Figure 3:
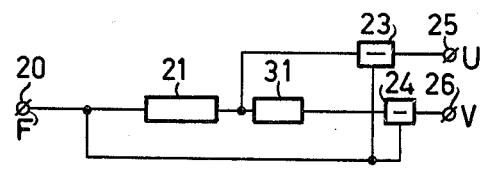

It is preferable to use instead of the delay devices 21 and 22 a delay device as shown in FIG. 3, in which components corresponding with those in FIG. 2 have been given the same reference numerals, it is alternatively possible to achieve the longer time delay by applying the signal, after it has passed through the delay device 21 and before it is applied the subtracting stage 24, to a further delay device 31, which produces a delay of half a chrominance subcarrier period, so that the desired delay by 284 chrominance subcarrier periods is again achieved before it reaches the stage 24.

Figure 4:
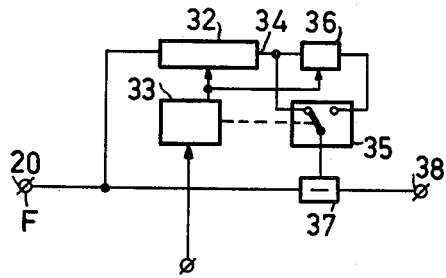

Particularly when the signals are available in digital form it is possible to effect processing in time-divison multiplex in such manner that at the output the u- and the v-components are transmitted in the same channel at alternate moments. To this end, in accordance with FIG. 4 the composite chrominance signal F is applied from the input terminal 20 to a first delay line 32, which is triggered by a clock pulse generator 33 at four times the chrominance subcarrier frequency and thus delays the signals of one line in 1134 clock pulses by 63.943 μs. The clock pulse generator 33 is triggered from a terminal t with an oscillation of a suitable frequency, preferably four times the chrominance subcarrier frequency.

The delayed signal thus obtained is applied from the output 34 of the first delay line 32 to a first input of a signal selection switch 35 and in addition to a second delay line 36 which produces with the same clock frequency a delay of 2 clock pulses of a total of 0.113 μs, so that at the output a signal is available which has been delayed by a total of 64.056 μs and which is applied to the second input of the signal selection switch 35. The signal selection switch 35 is operated by the clock pulse generator 33 at twice the chrominance subcarrier frequency in such manner that during the period of time in which the chrominance subcarrier oscillation $\cos(f_o \cdot 2\pi \cdot t)$ assumes its highest values, the signal which has been delayed by 63.943 μs is transmitted to the subtracting stage 37, and that during the periods of time in which the chrominance subcarrier oscillation $\cos(2\pi f_o \cdot t)$ passes through zero the signal which was delivered by 64.056 μs is transmitted to the subtracting stage 37, to which also the input signal F from terminal 20 is applied. Then the samples of the separated u- and v-components, respectively, of the composite chrominance signal F are alternately available at the output terminal 38, which is connected to the output of the subtracting stage 37, the rhythm of the occurrence of the samples of each component being twice the chrominance subcarrier frequency.

Figure 5:
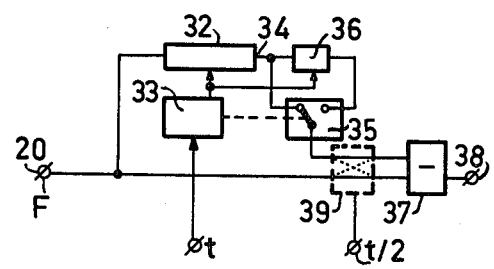

When the clock pulse frequency at which the signal selection switch 35 is operated as well as the sampling frequency are equal to four times the chrominance subcarrier frequency, the sampling pulses may be located, in relation to the chrominance subcarrier, at the four instants at which the signals +u, +v, −u, −v, and +u, −v, −u, +v, occur during alternate line periods respectively. It is then possible to eliminate the sign change which is determined by the modulation of the chrominance subcarrier and to obtain the demodulated signal (U, V) by means of a cross-over switch 39 which periodically interchanges the inputs of the subtracting stage 37 at a rate corresponding to the chrominance subcarrier frequency, so at half the frequency with which the switch 35 is operated. The switch 39 is controlled by a control signal t/2 of the chrominance subcarrier frequency the phase of which is shifted and reshifted at half the line frequency over a period corresponding to a sampling interval. This is shown in FIG. 5, which essentially corresponds to FIG. 4, but in which the cross-over switch stage 39, which preceeds the subtracting stage 37 is drawn with a broken line. Then the demodulated signals U and V are alternately obtained in time-division multiplex at the output 38 of the stage 37.

It is of course possible to extend each of the delayed and undelayed paths with a same additional delay without influencing the delay differences. Such circuits also should be considered to be protected by the claims.

What is claimed is:

1. A circuit arrangement for separating the components of a PAL-colour television signal, in which the composite chrominance signal is applied through a first path and through a second path delayed by substantially one line period or a multiple thereof relative to the first path to respective inputs of a first and second combining stage, particularly an adder or a subtracting stage, from the outputs of which the separated chrominance signal components can be derived, said circuit arrangement comprising:
    a first and second delay device in said second signal path, and
    a first and second combining device having their inputs connected respectively to said first and second signal paths,
    said delayed signal being applied to said first combining stage through said first delay device producing a time delay of, 283.5 chrominance subcarrier periods and to said second combining stage through said first and second delay devices, said second delay device producing a time delay of 0.5 chrominance subcarrier period.

2. A circuit arrangement for separating the components of a PAL-colour television output signal transmitted in time division multiplex form, in which the composite chrominance signal is applied through a first direct path and through a second delayed path, delayed by substantially one line period or a multiple thereof relative to the first path to respective inputs of a combining stage, particularly an adder or a subtracting stage, from the output of which the separated chrominance signal components can be derived, said circuit arrangement comprising:
    a first and second delay device,
    a combining stage, and
    a changeover switch,
    said delayed signal being taken from the input or the output of said second delay device by means of said change-over switch which is periodically operated in the rhythm of a multiple of the chrominance subcarrier frequency and is applied to said combining stage.

* * * * *